United States Patent

Tatematsu et al.

[11] Patent Number: 5,899,533
[45] Date of Patent: May 4, 1999

[54] RECLINING MECHANISM FOR VEHICLE SEAT

[75] Inventors: Kazuhisa Tatematsu, Nagoya; Makoto Asano, Toyota, both of Japan

[73] Assignee: Araco Kabushiki Kaisha, Aichi-ken, Japan

[21] Appl. No.: 09/110,433

[22] Filed: Jul. 6, 1998

[30] Foreign Application Priority Data

Jul. 4, 1997 [JP] Japan .................................... 9-179932

[51] Int. Cl.$^6$ ...................................................... B60N 2/22
[52] U.S. Cl. ............................................ 297/367; 297/366
[58] Field of Search ...................................... 297/366, 367, 297/368, 378.12

[56] References Cited

U.S. PATENT DOCUMENTS

| 4,634,182 | 1/1987 | Tanaka | 297/367 X |
| 4,659,146 | 4/1987 | Janiaud | 297/367 |

FOREIGN PATENT DOCUMENTS

| 893854 | 9/1953 | Germany | 297/367 |
| 2364755 | 8/1974 | Germany | 297/367 |
| 2414910 | 10/1974 | Germany | 297/367 |
| 7-265154 | 10/1995 | Japan . | |

*Primary Examiner*—Peter R. Brown
*Attorney, Agent, or Firm*—Hazel & Thomas, P.C.

[57] ABSTRACT

A reclining mechanism composed of a lower arm member for attachment to a frame structure of a seat cushion of a vehicle seat, an upper arm member placed in a common plane with the first arm member for attachment to a frame structure of a backrest of the vehicle seat and having a recessed portion formed at a lower end portion thereof and opposed to a ratchet portion formed on an upper end of the lower arm member, a slide pawl slidably coupled within the recessed portion of the upper arm member to be moved toward and away from the ratchet portion of the lower arm member for engagement therewith, a pair of side plates attached to opposite faces of the lower and upper arm members, the side plates being connected with the lower arm member by means of a hinge pin for relative rotation about the hinge pin and fixed to the upper arm member, an operation shaft rotatably supported on one of the side plates, and a release arm mounted on the operation shaft for rotation therewith to retract the slide pawl from the ratchet portion of the lower arm member.

3 Claims, 5 Drawing Sheets

RECLINING MECHANISM FOR VEHICLE SEAT

BACKGROUND OF THE INVENTION

1. Field of the Invention

The present invention relates to a reclining mechanism for a vehicle seat for adjusting an inclined angle of a back rest of the seat relative to a seat cushion.

2. Description of the Prior Art

Disclosed in Japanese Patent Laid-open Publication No. 7-265154 is a reclining mechanism for a vehicle seat which is composed of a pair of lower arm members for attachment to a frame structure of a seat cushion of the seat, an upper arm member for attachment to a frame structure of a back rest of the seat, the upper arm member having a semi-circular external tooth portion formed at its lower end and being disposed between the lower arm members and connected to the lower arm members by means of a hinge pin for relative rotation about the hinge pin, a slide pawl slidably supported by the lower arm members to be moved in a radial direction with respect to the hinge pin and loaded by a spring for engagement with the external tooth portion of the upper arm member, and a release arm rotatable supported on the lower arm members to disengage the slide pawl from the external tooth portion of the upper arm member against the load of the spring.

In the reclining mechanism, the upper arm member is in the form of a single plate, while the lower arm members each are in the form of a thin sheet metal and pressed outward to form a recessed portion for containing the slide pawl. To enhance the engagement strength of the slide pawl with the tooth portion of the upper arm member, it is required to increase the thickness of the slide pawl and the upper arm member. It is, however, difficult to increase the thickness of the slide pawl and the upper arm member in such a construction of the reclining mechanism without causing any problem in manufacturing processes.

SUMMARY OF THE INVENTION

It is, therefore, a primary object of the present invention to provide a reclining mechanism capable of increasing the engagement strength of the slide pawl in a simple construction.

According to the present invention, the object is accomplished by providing a reclining mechanism for a vehicle seat, which comprises a first arm member for attachment to a frame structure of a seat cushion or a backrest of the vehicle seat, the first arm member having a ratchet portion formed at one end thereof, a second arm member placed in a common plane with the first arm member for attachment to a frame structure of the other of the backrest or the seat cushion, the second arm member having a recessed portion formed at one end portion thereof and opposed to the ratchet portion of the first arm member, a slide pawl slidably coupled within the recessed portion of the second arm member to be moved toward and away from the ratchet portion of the first arm member for engagement therewith, a pair of side plates attached to opposite faces of the first and second arm members, the side plates being connected with the first arm member by means of a hinge pin for relative rotation about the hinge pin and fixed to the second arm member, an operation shaft rotatably supported on one of the side plates, and a release arm mounted on the operation shaft for rotation therewith to retract the slide pawl from the ratchet portion of the first arm member.

In a practical embodiment of the present invention, it is preferable that a cam element is disposed within the recessed portion of the second arm member and mounted on one end of the operation shaft extended into the recessed portion for rotation therewith, wherein the cam element Is engaged with a cam surface formed on the slide pawl for maintaining the slide pawl in engagement with the ratchet portion of the first arm member and for permitting retraction of the slide pawl from the ratchet portion of the first arm member when it is rotated by the operation shaft. It is also preferable that the first and second arm members, the slide pawl and the cam element are formed in the same thickness and placed in a common plane.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
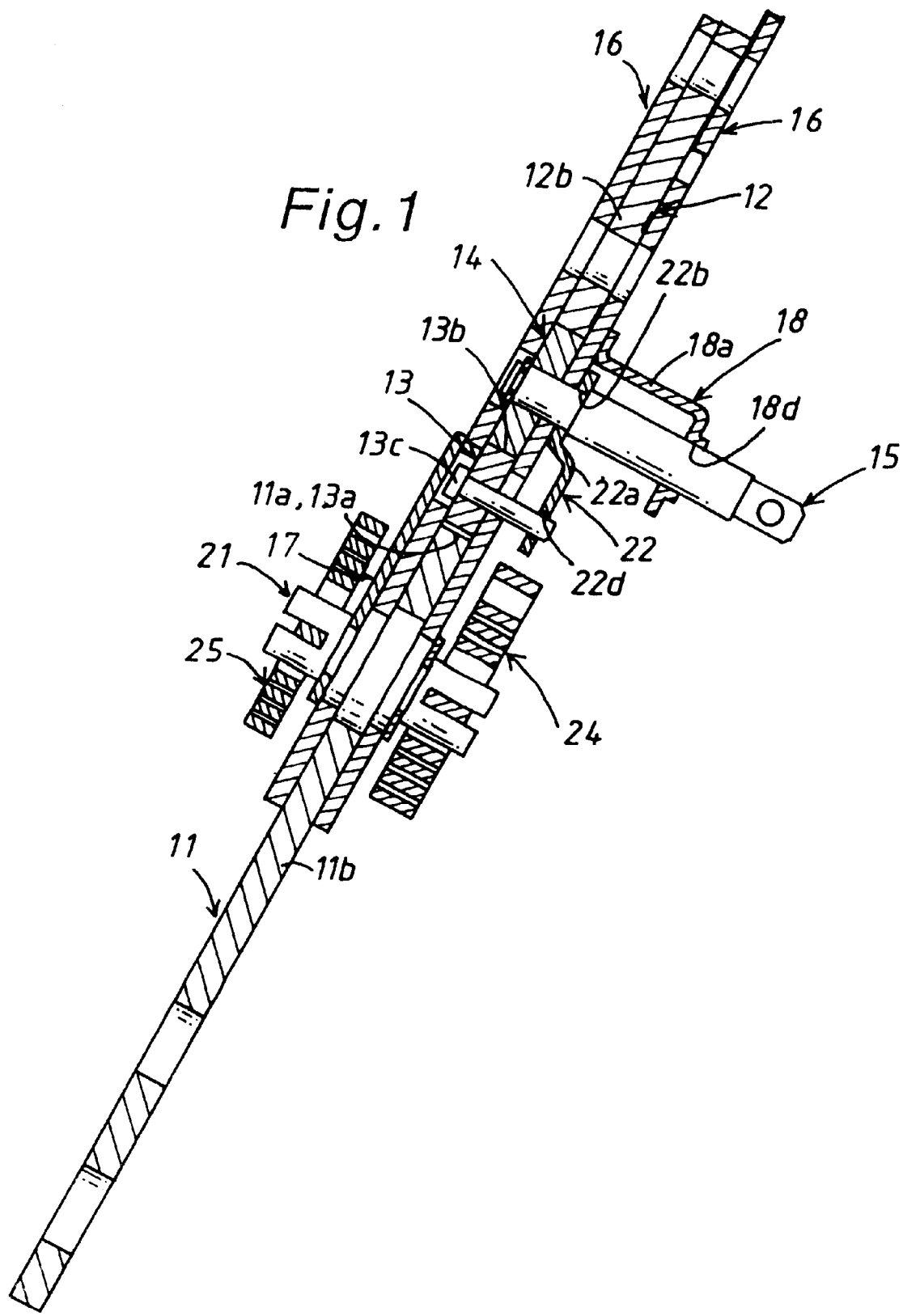
FIG. 1 is a vertical sectional view of a reclining mechanism in accordance with the present invention.
Figure 2:
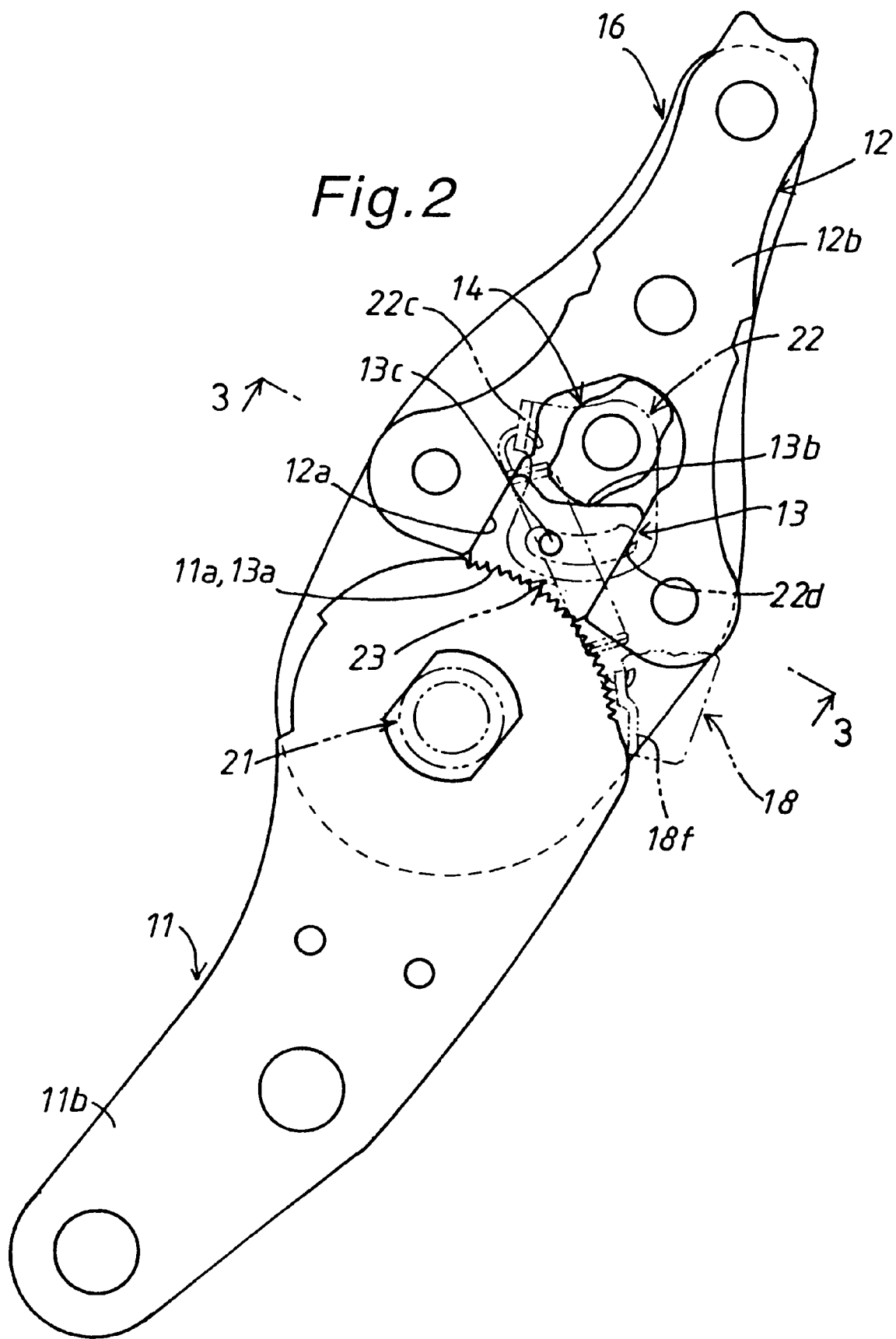
FIG. 2 is a side view of the reclining mechanism in a condition where one of side plates is removed to clearly illustrate the interior of the reclining mechanism.
Figure 3:
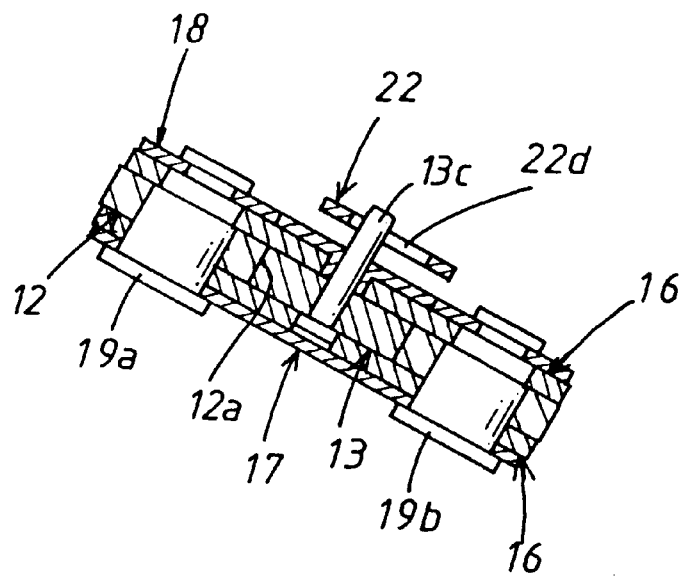
FIG. 3 is a cross-sectional view taken along line 3—3 in FIG. 2.

In FIGS. 1 to 3, there is illustrated a reclining mechanism for a vehicle seat in accordance with the present invention. The reclining mechanism includes a lower arm member 11, an upper arm member 12, a pawl 13, a cam element 14 and an operation shaft 15.

Figure 8A:
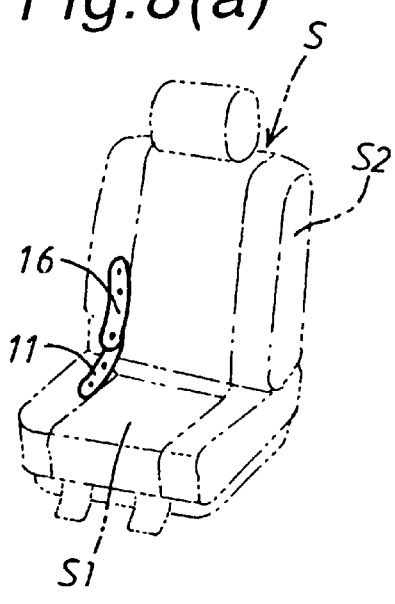
FIG. 8(a) is a schematic illustration of the reclining mechanism mounted on a single passenger seat.

As shown in FIG. 8(a), the lower arm member 11 is mounted to a rear portion of a seat cushion S1. The lower arm member 11 has a semi-circular ratchet portion 11a formed at its upper end and a mounting portion 11b for attachment to a support frame of the seat cushion S1. The upper arm member 12 is disposed between a pair of side plates 16 and mounted to a lower portion of a back rest S2 of the vehicle seat through the side plates 16. As clearly shown in FIG. 2, the upper arm member 12 has a recessed portion 12a opening downward and a mounting portion 12b for attachment to a support frame of the back rest S2, As clearly shown in FIG. 1, the lower and upper arm members 11 and 12 are placed In a common plane between the side plates 16. The upper arm member 12 is integrally assembled with the side plates 16 by means of a pair of laterally spaced mounting pins 19a, 19b as shown in FIG. 3. The side plates 16 are rotatably supported on the upper portion of lower arm member 11 by means of a hinge pin 21 as shown in FIGS. 1 and 2. Thus, the upper arm member 12 is pivoted to the lower arm member 11 for relative rotation about the hinge pin 21.

In this embodiment, the lower and upper arm members 11 and 12 each are made of thick sheet metal and formed higher in stiffness than the side plates 16. The slide pawl 13 and cam element 14 each are formed In the same thickness as the lower and upper arm members 11 and 12 and contained within the recessed portion 12a of upper arm member 12. The slide pawl 13 has an arcuate tooth portion 13a formed at its lower end for engagement with the ratchet portion 11a of lower arm member 11 and a cam surface 13b formed at its upper end.

The slide pawl 13 is placed in the recessed portion 12a of upper arm member 12 to be moved in a radial direction with respect to an axis line defined by the hinge pin 21.

The cam element 14 placed in the recessed portion 12a of upper arm member 12 is mounted on the operation shaft 15 for rotation therewith and engaged with the cam surface 13b of slide pawl 13 to move the slide pawl 13 toward and away from the ratchet portion 11a of lower arm member 11. As clearly shown in FIG. 1, the operation shaft 15 is extended into the recessed portion 12a of upper arm member 12 through a support plate 18, a release arm 22 and the right-hand side plate 16 to support the cam element 14 mounted thereon.

Figure 4:
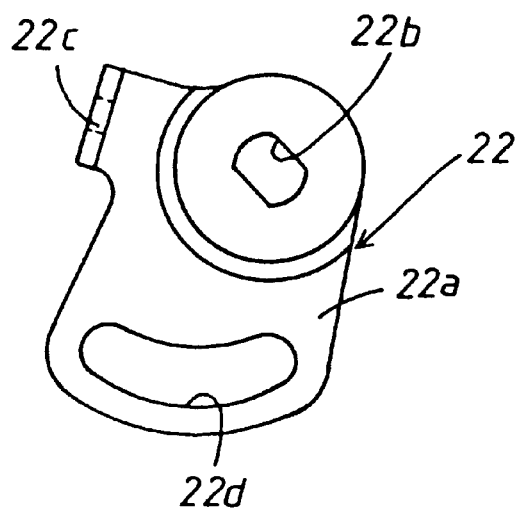
FIG. 4 is a front view of a release arm shown in FIG. 1.

As shown in FIG. 4, the release arm 22 has a mounting hole 22b formed at its upper portion, a side flange 22c formed at its one side and an arcuate cam hole 22d formed at its lower portion. The operation shaft 15 is extended through the mounting hole 22b to position the release arm 22 at its stepped portion. Thus, the release arm 22 is supported on the operation shaft 15 for rotation therewith and located outside the side plate 16. A cam pin 13c fixed to the slide pawl 13 is extended outward through the side plate 16 and placed in the cam hole 22d of release arm 22.

Figure 5:
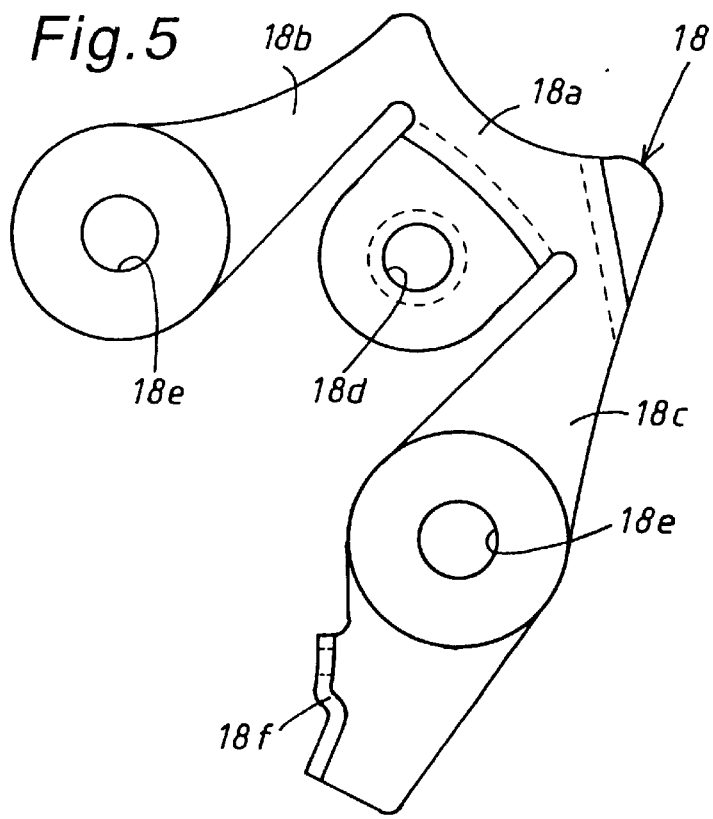
FIG. 5 is a front view of a support member shown in FIG. 1.

As shown in FIG. 5, the support plate 18 has a body portion 18a integrally formed with a pair of arm portions 18b, 18c and an upturned portion formed with a through hole 18d. The arm portions 18b, 18c of support plate 18 each are formed with a mounting hole 18e, and the arm portion 18c is formed with a flange 18f at its one side. As shown in FIG. 1, the support plate 18 is placed outside the side plate 16 and fixed to the side plate 16 by means of the mounting pins 19a, 19b inserted through each mounting hole 18e of the arm portions 18b, 18c. Thus, the support plate 18 is arranged to support the operation shaft 15 inserted through the through hole 18d.

As shown in FIG. 2, a coil spring 23 is engaged at its opposite ends with the flange 22c of release arm 22 and the flange 18f of support plate 18 placed outside the side plate 16 to bias the release arm 22 and operation shaft 15 in a counterclockwise direction in the figure. Under the load of coil spring 23, the cam element 14 is engaged with the cam surface 13b of slide pawl 13 to maintain the slide pawl 13 in engagement with the ratchet portion 11a of lower arm member 11.

As shown in FIG. 1, a pair of spiral springs 24 and 25 are assembled with the reclining mechanism to bias the backrest S2 toward a neutral position. The spiral springs 24 and 25 are wound relatively in a reverse direction. The spiral spring 24 is engaged at its inner end with one end of the hinge pin 21 and at its outer end with a retainer plate 17 attached to the left-hand side plate 16. The spiral spring 25 is engaged at its inner end with the other end of the hinge pin 21 and at its outer end with a portion of the support plate 18.

Figure 6:
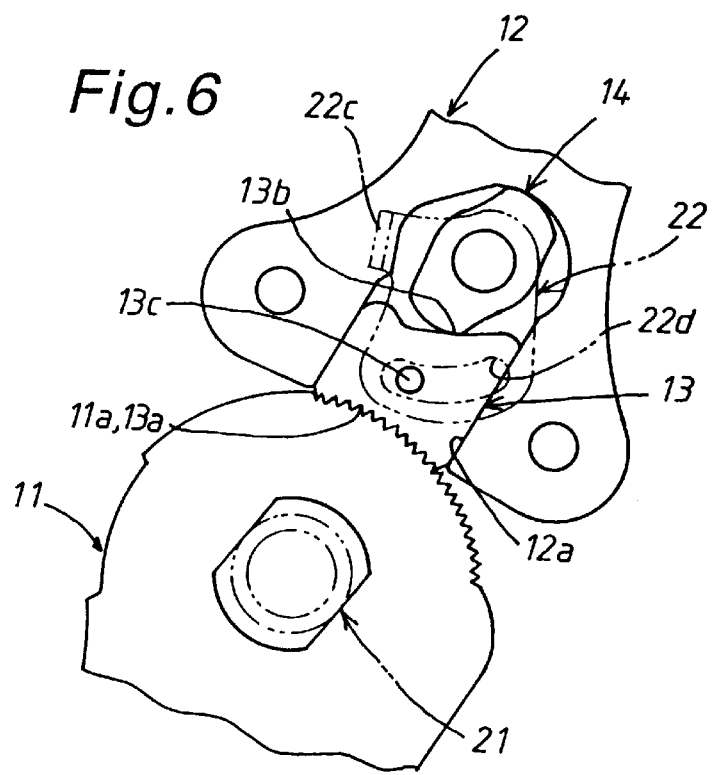
FIG. 6 illustrates a slide pawl maintained in engagement with a ratchet portion in the reclining mechanism.
Figure 7:
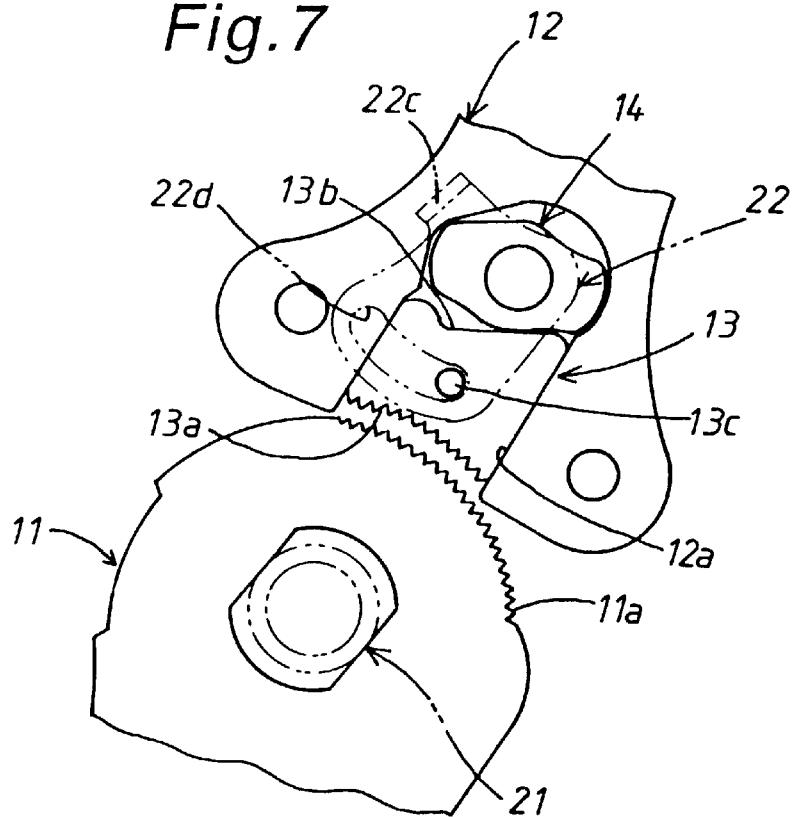
FIG. 7 illustrates a released condition of the reclining mechanism where the slide pawl is disengaged from the ratchet portion.

Assuming that as shown in FIG. 6, the release arm 22 is placed in position under the load of coil spring 23 to maintain the cam element 14 in engagement with the cam surface 13b of slide pawl 13 and a side wall of the recessed portion 12a. the slide pawl 13 is maintained in engagement with the ratchet portion 11a of lower arm member 11 to retain the backrest S2 at a desired angular position. When it is desired to adjust the inclined angle of the backrest S2, the operation shaft 15 is operated by a handle (not shown) in a clockwise direction to rotate the release arm 22 against the load of coil spring 23 and to rotate the cam element 14 In the clockwise direction thereby to permit upward movement of the slide pawl 13. In this instance, the cam pin 13c of slide pawl 13 is guided by the cam hole 22d of release arm 22 to cause upward movement of the slide pawl 13 as shown in FIG. 7. In such a condition, the backrest S2 can be inclined to a desired angular position. When the operation shaft 15 is released after the backrest S2 has been adjusted to the desired angular position, the release arm 22 and cam element 14 are returned by the load of coil spring 23 to engage the slide pawl 14 with the ratchet portion 11a of lower arm 11 thereby to retain the backrest S2 at the adjusted angular position.

As in the reclining mechanism, the slide paw 13 coupled within the recessed portion 21a is supported by the upper arm member 12 in a fore-and-aft direction and supported by the side plates 16 in a lateral direction, the engagement strength of the slide pawl 13 with the ratchet portion 11a of lower arm member can be increased by adjustment of the upper and lower arm members 11 and 12 and both the side plates 16 in thickness. In the reclining mechanism. It is to be noted that the cam element 14 mounted on the operation shaft 15 is engaged with the cam surface 13b of slide pawl 13 under the load of coil spring 23 to maintain the slide pawl 13 in engagement with the ratchet portion 11a of lower arm member 11 and is disengaged from the cam surface 13b of slide pawl 13 by operation of the operation shaft 15 to release the engagement of the slide pawl 13 with the ratchet portion 11a of lower arm member 11. This is useful to enhance the engagement force of the slide pawl 13 with ratchet portion 11a of lower arm member 11.

As in the reclining mechanism, the lower arm member 11, upper arm member 12, slide pawl 13 and cam element 14 are formed in the same thickness and assembled in a common plane. The stiffness of the component parts can be increased in a simple manner to enhance the support strength of the backrest against an impact acting thereon.

Figure 8B:
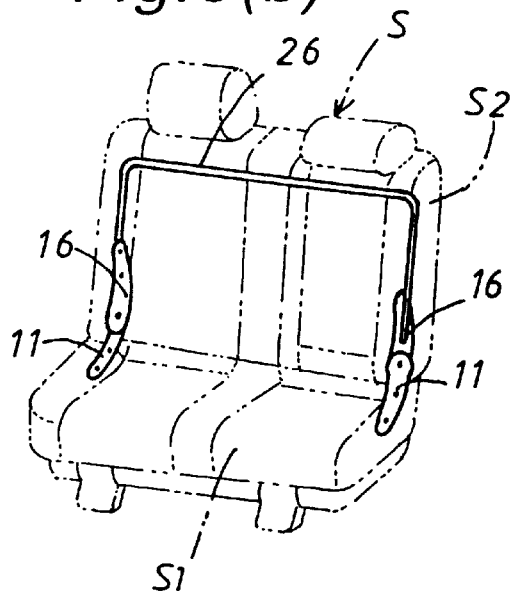
FIG. 8(b) is a schematic illustration of the reclining mechanism mounted on a two passenger seat.

In actual use, the reclining mechanism can be assembled in pairs with a two passenger seat as shown in FIG. 8(b) wherein it is desirable that both the reclining mechanisms are operatively connected at their operation shafts 15 by means of a cable 26.

What is claimed is:

1. A reclining mechanism for a vehicle seat, comprising:
    a first arm member for attachment to a frame structure of a seat cushion or a backrest of the vehicle seat, said first arm member having a ratchet portion formed at one end thereof;
    a second arm member placed in a common plane with said first arm member for attachment to a frame structure of the other of the backrest or the seat cushion, said second arm member having a recessed portion formed at one end portion thereof and opposed to the ratchet portion of said first arm member;
    a slide-pawl slidably coupled within the recessed portion of said second arm member to be moved toward and away from the ratchet portion of said first arm member for engagement therewith;

a pair of side plates attached to opposite faces of said first and second arm members, said side plates being connected with said first arm member by means of a hinge pin for relative rotation about the hinge pin and fixed to said second arm member;

an operation shaft rotatably supported on one of said side plates;

a release arm mounted on said operation shaft for rotation therewith to retract said slide pawl from the ratchet portion of said first arm member.

2. A reclining mechanism as claimed in claim 1, wherein a cam element is disposed within the recessed portion of said second arm member and mounted on one end of said operation shaft extended into the recessed portion for rotation therewith, said cam element being engaged with a cam surface formed on said slide pawl for maintaining said slide pawl in engagement with the ratchet portion of said first arm member and for permitting retraction of said slide pawl from the ratchet portion of said first arm member when it is rotated by said operation shaft.

3. A reclining mechanism as claimed in claim 2, wherein said first and second arm members, said slide pawl and said cam element are formed in the same thickness and placed in a common plane.

* * * * *